United States Patent [19]

Beyersbergen van Henegouwen et al.

[11] Patent Number: 4,634,020
[45] Date of Patent: Jan. 6, 1987

[54] CASSETTE WITH A LATCHING PIVOTED COVER

[75] Inventors: Cornelis M. Beyersbergen van Henegouwen; Hubertus F. W. van de Kerkhof; Karel G. M. Koken; John C. J. Olierook, all of Eindhoven, Netherlands

[73] Assignee: U.S. Philips Corporation, New York, N.Y.

[21] Appl. No.: 687,487

[22] Filed: Dec. 28, 1984

Related U.S. Application Data

[63] Continuation of Ser. No. 609,243, May 11, 1984, abandoned.

[30] Foreign Application Priority Data

Jan. 25, 1984 [NL] Netherlands .................. 8400226

[51] Int. Cl.⁴ ............................................. G03B 1/04
[52] U.S. Cl. .................... 220/335; 242/198; 242/199; 360/132
[58] Field of Search ............... 220/334, 335; 206/387; 242/198, 199; 360/132

[56] References Cited

U.S. PATENT DOCUMENTS

| | | | |
|---|---|---|---|
| 3,900,170 | 8/1975 | Serizawa | 242/198 |
| 3,900,172 | 8/1975 | Kamaya | 242/198 |
| 4,036,396 | 7/1977 | Kennedy et al. | 220/242 |
| 4,173,319 | 11/1979 | Umeda | 242/199 |
| 4,180,220 | 12/1979 | Shiba et al. | 242/199 |
| 4,418,373 | 11/1983 | Fujimori et al. | 242/199 X |
| 4,422,599 | 12/1983 | Okamura et al. | 242/198 |
| 4,466,583 | 8/1984 | Giannis et al. | 242/198 |
| 4,490,763 | 12/1984 | Hoshino et al. | 360/132 |

FOREIGN PATENT DOCUMENTS

| 146218 | 9/1979 | Fed. Rep. of Germany ...... 360/132 |
|---|---|---|
| 215618 | 1/1981 | Fed. Rep. of Germany ...... 360/132 |

*Primary Examiner*—Steven M. Pollard
*Attorney, Agent, or Firm*—David R. Treacy

[57] ABSTRACT

A device having a pivotal cover, such as a magnetic tape cassette, for covering one or more front openings between the front edges of two major walls which extend generally parallel away from the opening. The cover has flanges by which it is connected at the sides of the device, through a pivot pin and a straight slot, on the pivot axis, and another pin which engages a circular segment slot. The circular segment slot has a recessed portion which the other pin engages when the cover is closed. The cover must be moved in a direction away from both major walls, to an unlatched position, before it can be pivoted to an open position adjacent one or the other of the major walls.

12 Claims, 6 Drawing Figures

CASSETTE WITH A LATCHING PIVOTED COVER

This is a continuation of application Ser. No. 609,243, filed May 11, 1984, abandoned.

BACKGROUND OF THE INVENTION

The invention relates to a tape cassette having two substantially parallel major walls, a front along which a part of the tape extends, and a cassette cover which comprises a major or front portion which when the cover is in the closed position covers the part of the tape which extends along the front and cover flanges which are pivotally connected to pivot pins, the axes of the pivot pins coinciding with each other and forming a pivot axis which is situated in a plane of symmetry situated at equal distances from the two major walls. The cassette cover is pivotable about the pivot axis from the closed position to two different open positions: a first open position in which the major or front portion is situated near one major wall and a second open position in which the major portion is situated near the other major wall at each side a semicircular slot is concentric with the pivotal axis, symmetrically located relative to the plane of symmetry and which is engaged by a journal or pin which is connected to the adjacent cover flange. A spring acts on the pin to keep the cassette cover in the closed position or to pivot it towards the closed position.

A magnetic-tape cassette of this type is described in U.S. Pat. No. 4,302,787. The cassette cover of this known cassette can be pivoted upwards and downwards against the pressure of the respective limbs of a hairpin spring. This spring ensures that the cover can pivot back automatically to the closed position. Since there is no latching mechanism for the closed position, inadvertent opening of the cassette cover is possible, for example when the cassette is held by the cassette cover. After inadvertent opening the part of the magnetic tape which extends across the front openings in the front wall may be damaged and/or soiled.

In order to allow the spring to pivot the cover correctly back from the respective open position to the closed position, the known cassette must have some clearance between the front wall and the major portion of the cover. Because of this clearance the front openings in the front wall cannot be closed in an optimum manner, for example to preclude the penetration of dust.

SUMMARY OF THE INVENTION

An object of the invention is to ensure that the openings in the front wall of such a tape cassette are closed correctly in the closed position of the cassette cover.

A further object is to provide latching means for the cassette cover to prevent the cover from being opened inadvertently.

In a device, such as a cassette, according to the invention, each cover flange is formed with a straight slot in which the device pivot pin is situated, in the closed position of the cassette cover. The longitudinal axis of the slot being disposed in the plane of symmetry. A circular slot portion is situated at that side of the pivot pin which is remote from the front wall. Near the plane of symmetry the circular slot has a radially recessed portion at that side which is remote from the pivot pin, the journal or pin on the adjacent cover flange being urged into said recessed portion by the spring force exerted by the spring in the closed position of the cassette cover.

In this way the cassette cover can be latched in the closed position because in this position each journal is urged into the recessed portion as a result of the force exerted by the spring. The change in position of the slot in each cover flange upon closure of the cover results in the cover being moved towards the front wall in the direction in which the major walls extend from the front opening, and effectively closing the front openings at the end of the closing movement of the cover. The cover swings upon only after a specific force has been exerted on the cover. In this way inadvertent opening of the cover is practically prevented. Moreover, when the cover is swung open the major portion of the cover is moved slightly away from the front wall to an unlatched position because each journal is moved out of the recessed portion, so that the clearance between the major portion of the cover and the front wall is such that the pivotal movement is not impeded by the front wall. A further advantage is that for latching the cassette cover a simple construction comprising a few parts is employed, so that this construction is particularly suitable for use in mass-manufactured magnetic-tape cassettes.

A preferred embodiment of the invention is characterized in that the recessed portion has a circularly cylindrical wall whose diameter substantially corresponds to the diameter of the journal or pin. This ensures that after closure of the device or cassette cover each journal is positioned firmly and accurately in the corresponding recessed portion. This results in a correct latching of the device or cassette cover and it guarantees that when the cover is closed it always occupies the correct position relative to the front wall.

An embodiment of the invention will be described in more detail, by way of example, with reference to the drawing.

DESCRIPTION OF THE PREFERRED EMBODIMENT

Figure 1:
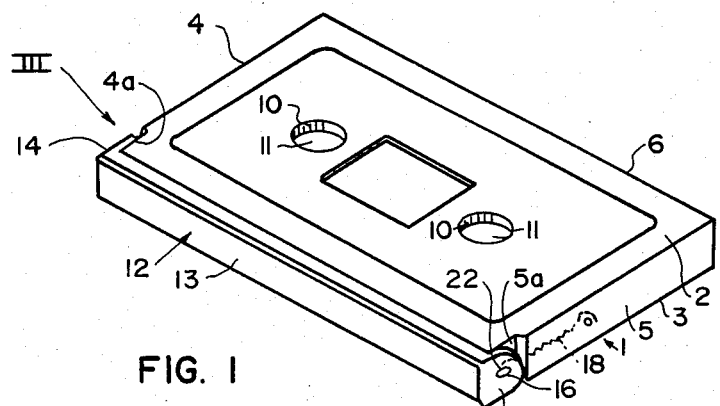
FIG. 1 is a perspective view of a magnetic-tape cassette in accordance with the invention.
Figure 2:
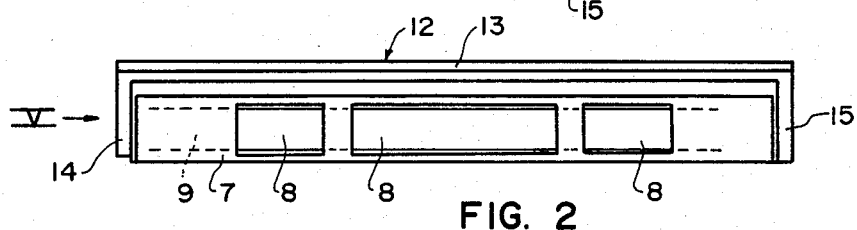
FIG. 2 is a front view of the cassette shown in FIG. 1, the cassette cover being shown in an open position.

As is shown in FIGS. 1 and 2, the magnetic-tape cassette in accordance with the invention is provided with a housing comprising two substantially parallel rectangular major walls 2 and 3. The housing 1 further comprises two substantially parallel rectangular side walls 4 and 5, a rear wall 6, and a front wall 7 which extends parallel to this rear wall. The front wall 7 is formed with three front openings 8, a part of a magnetic tape 9 contained in the cassette extending behind the front openings 8 along the front wall 7 to cooperate with parts of a magnetic-tape-cassette apparatus, not shown. These parts are magnetic heads, a pressure roller and a capstan. In a manner not shown the magnetic tape 9 is wound on two hubs 10 which are mounted for rotation between the two major walls 2 and 3. For driving the hubs 10 two circular openings 11 are formed both in the major wall 2 and in the major wall 3, so that the cassette in accordance with the invention is of the so-called reversible type. Drive spindles of the magnetic-tape-cassette apparatus are engageable with the openings 11. This construction of the cassette in accordance of the invention may be compared with the customary construction of the so-called compact cassette.

Figure 5:
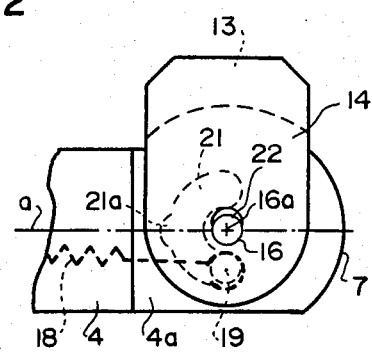
FIG. 5 is an enlarged-scale side view taken on the line V in FIG. 2.
Figure 4:
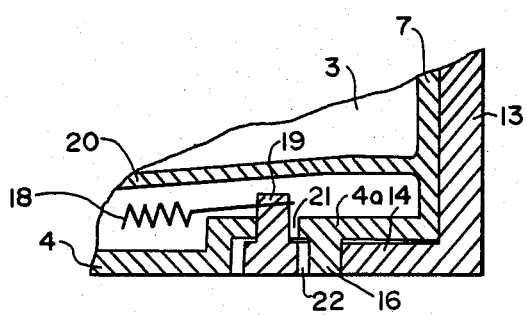
FIG. 4 is a sectional view taken on the lines IV—IV in FIG. 3.
Figure 6:
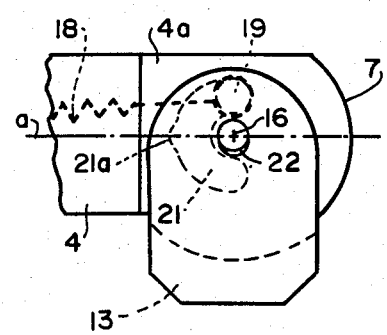
FIG. 6 is a side view similar to that shown in FIG. 5, the cassette cover now being shown in another open position.

Further the cassette in accordance with the invention comprises a cassette cover 12, having a front or major portion 13 which, as is shown in FIG. 4, is positioned against the front wall 7 in the closed position of the cover and thereby covers the stretched part of the magnetic tape 9. On each side of the major portion 13 the cover 12 comprises cover flanges 14 and 15 which extend along the side walls 4 and 5 respectively and which are pivotally connected to the side walls by means of pivot pins 16 on these side walls. The common axis 16 of the pivot pins 16 constitutes the pivot axis of the cassette cover, which axis extends perpendicularly to the side walls 4 and 5 and is disposed in a plane of symmetry a situated at equal distances from the major walls 2 and 3. By pivoting the cassette cover about the pivot axis 16a the cassette cover can be moved to a first open position, as is shown in FIGS. 2 and 5, and a second open position, as shown in FIG. 6.

A tension spring 18 is connected to each side wall 4 and 5 respectively, which spring extends in the longitudinal direction parallel to the major walls 2 and 3 in the closed position of the cover 12 and which is also secured to journals 19 on the inner sides of the side walls 4 and 5 respectively. A wall 20 separates the spring 18 from the remainder of the interior of the cassette; preferably, the wall 20 extends up to the front wall 7. Each journal 19 engages a semi-circular slot 21 which is concentric with the pivot axis 16a of the cover 12 and which is formed in a slightly off-set portion 4a or 5a of a side wall. The slot 21 is disposed symmetrically relative to the plane of symmetry a and is situated at that side of the pivot pin 16 which is remote from the front wall.

Figure 3:
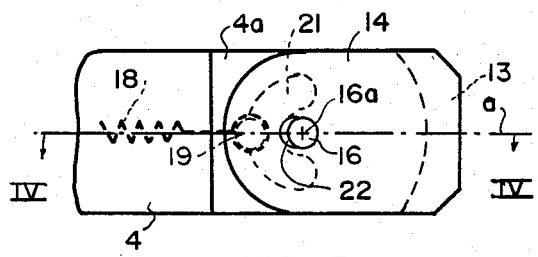
FIG. 3 is an enlarged-scale side view at the left-hand side wall and the adjacent cover flange, taken on the line III in FIG. 1.

At the side which is remote from the pivot pin 16 the slot 21 has a central radially recessed portion 21a, which is also disposed symmetrically relative to the plane of symmetry a. In the closed position of the cover 12 the spring 18 pulls the journal 19 into the recessed portion 21a. In this position the cover 12 is pulled towards the rear wall 6 by the two springs 18 near the side walls 4 and 5 respectively, the inner side of the major portion 13 being positioned against the front wall 7. In this respect it is important that the pivot pins 16 each engage a straight slot 22, the longitudinal axis of this slot, as is shown in FIG. 3, being disposed in the plane of symmetry a if the cover 12 is in a closed position. Thus, because of the elongation of the slot 22, during the movement of the journal 19 in the recessed portion 21a the flange 14 and 15 can slide along the pivot pin 16. The length of the slot 22 is adapted to the dimension of the circuit segment slot 21 recessed portion 21a combination, measured in the plane of symmetry a in FIG. 3 in such a manner that the journal 19 can slide into the recessed portion 21a and assume a stable position in this recessed portion, while substantially at the same time the pivot pin 16 abuts with the right-hand end wall of the slot 22. The journal 19 can leave the recessed portion 21a by a movement of the slot 22 over the pin 16.

As stated above, the springs 18 pull the journals 19 into the recessed portions 21a in the closed position of the cover 12. Since each recessed portion 21a preferably has a circularly cylindrical wall of a diameter which substantially corresponds to that of the journal 19, the journal occupies a stable position in the recessed portion, so that inadvertent opening of the cover 12 is practically excluded. Thus, in the closed position the cover 12 is latched and the part of magnetic tape 9 situated behind the front wall 7 as well as the other parts of the tape are protected effectively against damage and the penetration of dirt.

The cover 12 can be swung open to the first (FIG. 5) and the second (FIG. 6) open position only if at least a certain force is exerted on the cover 12, perpendicularly to the major walls 2 and 3. Swinging open is effected when the cassette is inserted into the magnetic-tape-cassette apparatus, for example by means of a cover-opening means provided in the apparatus. During opening the slot 22 moves until its left-hand end, viewed in FIG. 3, abuts with the pivot pin 16. This movement is effected because almost simultaneously the journal 19 moves from the recessed portion 21a in the slot 21 in a downward or upward direction, for example owing to the upwardly or downwardly directed force exerted by the cover opening means, which is effected against the force of the spring 18. This has the advantage that the movement of the slots 22 results in the cover 12 being moved slightly to the right to the unlatched position, viewed in FIG. 3, so that the inner side of the major portion 13 moves away from the front wall 7, enabling the cover to be swung open without being impeded by the front wall. In the first or the second open position each journal 19 is urged against the relevant end of the slot 21 by the cover opening means, and is kept in this position as long as the cover must be open. In this position the major portion 13 extends substantially parallel and adjacent to one of the major walls above the front portion of the major wall 2 or beneath the front portion of the major wall 3, so that parts of the apparatus can move freely through the front openings 8 to cooperate with the magnetic tape 9.

For the cassette in accordance with the invention it is essential that as soon as the cover opening means is moved away from the cover 12 this cover moves back to the closed positions, both from the first and from the second open position, under the influence of the spring 18 without any exterior action, so that the journals 19 are again pulled into the recessed portions 21a; and the cover 12 is automatically locked again, and is pulled against the front wall 7. This latching of the cover 12 and the correct sealing of the front openings 8 in the closed position of the cover render the cassette in accordance with the invention particularly suitable for the recording and/or the reproduction of digital information because a cassette housing which can be closed effectively is desirable for this purpose.

What is claimed is:

1. A magnetic-tape cassette provided with a housing which comprises two substantially parallel major walls which each have two openings for the passage of drive spindles of a magnetic-tape-cassette apparatus, two substantially parallel side walls, a rear wall, a front wall along which a part of magnetic tape extends, and a cassette cover which comprises a major portion which, when the cover is in the closed position, covers the part of the magnetic tape which extends along the front wall and cover flanges which are situated one on each side of the major portion adjacent the side walls and which are pivotally connected to pivot pins on the adjacent side walls, the axes of the pivot pins on the side walls coinciding with each other and forming a pivotal axis which is situated in a plane of symmetry situated at equal distances from the two major walls of the housing, about which pivotal axis the cassette cover is pivotable from the closed position to two different open positions, i.e. a first open position in which the major portion is situated near a first major wall and in a second open position in which said major portion is situated near a second major wall, each of the side walls being formed with a semicircular slot which is concentric with the pivotal axis, which is situated symmetrically relative to said plane of symmetry and which engages a journal which is connected to the adjacent cover flange, a spring acting on said journal to keep the cassette cover in the closed position or to pivot it towards the closed position, characterized in that each cover flange is formed with a straight slot in which the pivot pin of the adjacent side wall is situated, the axis of the slot being disposed in said plane of symmetry in the closed position of the cassette cover, the slot in each side wall being situated at that side of the pivot pin which is remote from the front wall, and near said plane of symmetry having a recesssed portion at that side which is remote from the pivot pin, the journal on the adjacent cover flange being urged into said recessed portion by the spring force exerted by the spring in the closed position of the cassette cover.

2. A magnetic-tape cassette provided with a housing which comprises:
two substantially parallel major walls which each have two openings for the passage of drive spindles of a magnetic-tape-cassette apparatus,
two substantially parallel side walls, each having a pivot pin projecting therefrom, the axes of the pivot pins on the side walls coinciding with each other and forming a pivot axis which is situated in a plane of symmetry situated at equal distances from the two major walls of the housing, each of the side walls being formed with a semicircular slot which is concentric with the pivot axis and is disposed symmetrically relative to said plane of symmetry,
a rear wall,
a front wall along which a part of magnetic tape extends, and
a cassette cover which comprises a major portion which, when the cover is in the closed position, covers the part of the magnetic tape which extends along the front wall, and cover flanges which are situated one on each side of the major portion adjacent the side walls and which are pivotally connected to the respective pivot pins on the adjacent side walls, each flange comprising a respective journal which engages a respective semicircular slot, the cassette cover being pivotable about said pivot axis from the closed position to a selected one of two different open positions, either a first open position in which the major portion is situated near a first major wall or a second open position in which said major portion is situated near a second major wall, and a respective spring acting on each journal to keep the cassette cover in the closed position or to pivot it towards the closed position,
characterized in that each cover flange is formed with a straight slot in which the pivot pin of the adjacent side wall is situated, the axis of the slot being disposed in said plane of symmetry in the closed position of the cassette cover, the slot in each side wall being situated at that side of the pivot pin which is remote from the front wall, and near said plane of symmetry having a recessed portion at that side which is remote from the pivot pin, the journal on the adjacent cover flange is urged into said recessed portion by the spring force exerted by the spring in the closed position of the cassette cover.

3. A magnetic tape cassette as claimed in claim 2, characterized in that the recessed portion has a circularly cylindrical wall whose diameter substantially corresponds to the diameter of the journal.

4. A pivoted cover arrangement for a device havng two wall portions each having a respective opening edge, said edges defining at least one opening from which said wall portions extend in a generally same direction; a cover arranged to extend across said opening, and means for pivotally connecting said cover to said wall portions to permit said cover to swing from a closed position to an open position, characterized in that said means comprises:
means for biasing said cover in said same direction;
means for limiting movement of said cover with respect to said wall portions from said closed position, to allow movement in a first opening direction only opposite said same direction to an unlatched position, and
means for permitting pivoting of said cover about a pivot axis transverse to said same direction when said cover is in said unlatched position, when the cover is in the open position said means for biasing also biasing the cover pivotally toward said unlatched position.

5. A cover arragement as claimed in claim 4, characterized in that at least one of said edges is generally linear, said same direction is transverse to said edge, and said axis is parallel to the generally linear edge.

6. A pivoted cover arrangement for a device having two wall portions each having a respective opening edge, said edges being generally co-planar and defining at least one opening from which said wall portions extend in a generally same direction; a cover arranged to extend across said opening, and means for pivotally connecting said cover to said wall portions to permit said cover to swing from a closed position to an open position, characterized in that said means comprises:
means for biasing said cover in said same direction;
means for limiting movement of said cover with respect to said wall portions from said closed position, to allow movement in a first opening direction only opposite said same direction to an unlatched position, and
means for permitting pivoting of said cover about an axis parallel to a plane through said edges when said cover is in said unlatched position;
said means for limiting comprises two pivot pins and two straight slots; at least when the cover is in the unlatched position, said pivot pins are coaxial with said pivot axis; at least when the cover is in the closed and the unlatched positions, said straight slots extend parallel to each other in said same direction; each pivot pin engages a respective one of said straight slots, each pin and respective straight slot being relatively slidable with respect to each other to permit movement of the cover from said closed to said unlatched position, and said means for permitting comprises two limiting pins and two circular segment slots; said limiting pins are colinear about a line parallel to said axis; said circular segment slots are parallel to each other and each define a respective center of curvature, said centers of curvature lying on a common axis, at least when the cover is in said unlatched position said common axis being coincident with said pivot axis; each circular segment slot has a radially recessed portion communicating with a circular portion, at least when the cover is in the closed and unlatched positions, said radially recessed portions extending in a direction parallel to said same direction; and each limiting pin engages a respective circular segment slot, said each limiting pin and respective circular segment slot being relatively slidable with respect to each other to permit movement from said closed to said unlatched position during engagement of the limiting pin with the respective radially recessed portion, and pivoting from the unlatched to the open position during engagement with the respective circular portion.

7. A cover arrangement as claimed in claim 6, for a device in which said edges are parallel, the device further comprising two side walls parallel to each other and perpendicular to said opening edges, each side wall extending in said generally same direction from said edges and extending between the respective two wall portions so as to form a device having a rectangular cross-section; and said cover comprising a front portion and two flanges, in the closed position each flange extending from the cover front portion in said same direction parallel to and overlapping a respective side wall, each pivot pin and the respective straight slot it engages being elements of a respective limit pair, one of said elements being formed on a cover flange and the other of said elements being formed on the overlapping side wall, and each limiting pin and respective circular segment slot it engages being elements of a respective permitting pair, one of said elements of a permitting pair being formed on a cover flange, and the other of said elements of said permitting pair being formed on the overlapping side wall.

8. A cover arrangement as claimed in claim 7, characterized in that the element of each permitting pair formed on the cover flange is the limiting pin, the respective circular segment slots being slots through the respective overlapping side wall, each of said limiting pins extending inwardly through and beyond the slot in the respective side wall, and said means for biasing comprises two springs, each spring having an end connected to a respective one of said limiting pins, said springs being tensioned and extending generally in said same direction from the limiting pins, each of said radially recessed portions extends in said same direction from the circular portion with which it communicates, and each limiting pin is disposed on the respective cover flange to a side of the respective limiting pair remote from the cover front portion, whereby said spring also urges the cover from the open toward the latched and then closed positions.

9. A cover arrangement as claimed in claim 8, characterized in that each limiting pin has a circular cylindrical portion, and the respective radially recessed slot portion has a circular cylindrical wall having a diameter substantially equal to that of the circular cylindrical pin portion, in the closed position said circular cylindrical portion engaging the respective circular cylindrical wall.

10. A cover arrangement as claimed in claim 7, characterized in that each limiting pin has a circular cylindrical portion, and the respective radially recessed slot portion has a circular cylindrical wall having a diameter substantially equal to that of the circular cylindrical pin portion, in the closed position said circular cylindrical portion engaging the respective circular cylindrical wall.

11. A pivoted cover arrangement for a device having two wall portions each having a respective opening edge, at least one of said edges being generally linear, said edges defining at least one opening from which said wall portions extend in a generally same direction transverse to said at least one edge; a cover arranged to extend across said opening, and means for pivotally connecting said cover to said wall portions to permit said cover to swing from a closed position to an open position, characterized in that said means comprises:

means for biasing said cover in said same direction;

means for limiting movement of said cover with respect to said wall portions from said closed position, to allow movement in a first opening direction only opposite said same direction to an unlatched position, said means for limiting comprising two pivot pins and two straight slots, and means for permitting pivoting of said cover about a pivot axis which is parallel to said at least one edge, and further characterized in that at least when the cover is in the unlatched position, said pivot pins are coaxial with said pivot axis; at least when the cover is in the closed and the unlatched positions, said straight slots extend parallel to each other in said same direction; each pivot pin engages a respective one of said straight slots, each pin and respective straight slot being relatively slidable with respect to each other to permit movement of the cover from said closed to said unlatched position, and said means for permitting comprises two limiting pins and two circular segment slots; said limiting pins are colinear about a line parallel to said pivot axis; said circular segment slots are parallel to each other and each define a respective center of curvature, said centers of curvature lying on a common axis, at least when the cover is in said unlatched position said common axis being coincident with said pivot axis; each circular segment slot has a radially recessed portion communicating with a circular portion, at least when the cover is in the closed and unlatched positions, said radially recessed portions extending in a direction parallel to said same direction; and each limiting pin engages a respective circular segment slot, said each limiting pin and respective circular segment slot being relatively slidable with respect to each other to permit movement from said closed to said unlatched position during engagement of the limiting pin with the respective radially recessed portion, and to permit pivoting from the unlatched to the open position during engagement with the respective circular portion.

12. A cover arrangement as claimed in claim 11, in which each of said edges is substantially linear and said edges define an axis of symmetry, said cover being pivotable to each of two open positions in which the cover is adjacent a respect one or the other of said wall portions, characterized in that said pivot axis is parallel to said axis of symmetry, and each circular portion extends in both angular directions from the respective communicating radially recessed portion.

* * * * *